United States Patent
Tonoli et al.

(10) Patent No.: US 7,806,239 B2
(45) Date of Patent: Oct. 5, 2010

(54) ELECTROMECHANICAL ACTUATING DEVICE FOR A WHEEL BRAKE SYSTEM OF A MOTOR VEHICLE AND A BRAKE SYSTEM EQUIPPED WITH SUCH AN ACTUATING DEVICE

(75) Inventors: Andrea Tonoli, Avigliana (IT); Jean Paul Voyat, Gresssan (IT); Guillaume Fracassi, Truchtersheim (FR)

(73) Assignee: Fondazione Torino Wireless, Turin (IT)

( * ) Notice: Subject to any disclaimer, the term of this patent is extended or adjusted under 35 U.S.C. 154(b) by 784 days.

(21) Appl. No.: 11/637,392

(22) Filed: Dec. 12, 2006

(65) Prior Publication Data

US 2007/0273198 A1 Nov. 29, 2007

(30) Foreign Application Priority Data

Dec. 14, 2005 (EP) .................................. 05027355

(51) Int. Cl.
*F16D 55/08* (2006.01)
(52) U.S. Cl. ...................................... 188/72.8; 188/156
(58) Field of Classification Search ................ 188/72.7, 188/72.8, 72.2, 156, 158, 161, 162
See application file for complete search history.

(56) References Cited

U.S. PATENT DOCUMENTS

| 5,501,305 | A | * | 3/1996 | Stalmeir et al. | ............ | 188/72.7 |
| 6,412,608 | B1 | * | 7/2002 | Mohr et al. | ................ | 188/72.8 |
| 6,623,087 | B1 | | 9/2003 | Wolff | .......................... | 303/10 |
| 6,666,308 | B1 | | 12/2003 | De Vries et al. | ............ | 188/157 |
| 6,896,106 | B2 | * | 5/2005 | Kramer | ..................... | 188/72.8 |
| 7,124,871 | B2 | * | 10/2006 | Friedmann et al. | ......... | 192/99 S |
| 2004/0026184 | A1 | * | 2/2004 | Baumann et al. | ........... | 188/72.7 |

FOREIGN PATENT DOCUMENTS

WO WO 2005/005854 1/2005

* cited by examiner

*Primary Examiner*—Thomas J Williams
(74) *Attorney, Agent, or Firm*—Fattibene and Fattibene; Paul A. Fattibene (57) ABSTRACT

An actuating system 1 for a wheel brake system of a motor vehicle, wherein the braking action is obtained by means of a rotatable cam element 2 fixed to the motor shaft 8 of an electric motor, with said rotatable cam element 2 abutting against an actuating member 4, so as to laterally displace said actuating member 4, resulting in the braking pads 5 being pressed against the friction element or brake disk. Recovery or adjustment of the backlash or gap arising due to the wear of the brake pads. The motor-cam group or assembly is displaced so as to keep the brake pads 5 in light contact with the friction element or disk but without exerting any unwanted braking action.

22 Claims, 6 Drawing Sheets

ELECTROMECHANICAL ACTUATING DEVICE FOR A WHEEL BRAKE SYSTEM OF A MOTOR VEHICLE AND A BRAKE SYSTEM EQUIPPED WITH SUCH AN ACTUATING DEVICE

FIELD OF THE PRESENT INVENTION

The present invention relates to the field of automotive applications. In particular, the present invention relates to an actuating device for a wheel brake system of a motor vehicle and to a brake system equipped with such an actuating device. Still in more detail, the present application relates to an electromechanical actuating device for a wheel brake system of a motor vehicle and a wheel brake system equipped with such an electromechanical actuating device. Furthermore, the present invention relates to an electromechanical actuating device for a wheel brake system and to a wheel brake system equipped with such an electromechanical actuating device, wherein said electromechanical actuating device allows the production of high breaking forces and to recover the wear of the brake pads.

DESCRIPTION OF THE PRIOR ART

During the last years, many efforts have been devoted in the automotive field to the development of new systems adapted to replace the conventional hydraulic and/or mechanic systems in many applications such as, for instance, the steering, brake and the shift systems. In particular, many efforts have been dedicated to the development of so-called "by wire" systems, i.e. of systems comprising electric and/or electronic equipment in combination with mechanical or hydraulic components. This, in particular, was due to the fact that the newly developed by wire systems were revealed to be quite useful for improving several characteristics of the vehicles, such as, for example, the vehicle dynamic, the comfort and the vehicle architecture, thus meeting the requirements of the customers. It has, in fact, to be noted that by wire systems, in particular, the by wire brake systems, offer improved performances in terms of a better control of the longitudinal and the lateral forces, thus leading to a better vehicle dynamic behavior, with the related improvement in terms of the passive and active safety. Moreover, concerning the comfort of the vehicle, the absence of mechanical links to the brake, steering, gear shift, clutch and the like, allows the improvement of the interface with the driver and his driving feeling. Furthermore, concerning the vehicle architecture, it came out that the absence of the mechanical links to the driver's command opens good possibilities towards new vehicle architecture with the related fallout of ergonomics and safety related problems.

Considering the by wire braking systems, these can be divided in two main groups, depending on the solution adapted for the brake actuator, namely:

a) electro-hydraulic brake actuators and/or actuating devices;

b) electro-mechanical brake actuators and/or actuating devices.

An example of an electro-hydraulic brake actuator can be found in document U.S. Pat. No. 6,623,087; in particular, the by wire brake system known from this document comprises an hydraulic actuator (pump) which is driven at variable speeds by an electric motor, along with two electro-valves debited to the control of the pressure of the hydraulic fluid. Moreover, an electronic control unit controls the functions of the electric motor and the electro-valves. This solution may be regarded as an hybrid electro-hydraulic by wire solution comprising an electronic control unit to manage the interaction between the driver, the actuators and the caliper.

The by wire electro-hydraulic actuator disclosed in the document U.S. Pat. No. 6,623,087 offers several advantages and allows to overcome (at least in part) the drawbacks affecting the conventional hydraulic systems. In fact, the electronic control exploited by the electronic control unit allows this system to be easily integrated and to be easily adapted to a common brake system. Moreover, due to the electric actuation, no efforts are required by the driver and a very high actuation speed is offered. Moreover, due to its hydraulic components, this system offers a very high reduction ratio since a relatively big displacement of the hydraulic actuator is transformed in a extremely small displacement of the braking pads. Furthermore, a very important feature of this by wire brake actuating device relates to the backlash recovery, namely to the possibility of automatically recovering the backlash of the braking pads due to their wear over time. In other words, the wear of the brake pads and the resulting backlash are automatically recovered and compensated, thanks to the use of the hydraulic fluid.

However, in spite of all the advantages offered, the electro-hydraulic by wire brake actuators of the kind known from document U.S. Pat. No. 6,623,087 are not free from disadvantages and/or drawbacks. In fact, the presence of hydraulic components (pump, pipes and fluid) also brings along some old problems affecting the conventional hydraulic actuators; in particular, the danger of leakages is still present, since the hydroscopic behavior of some hydraulic fluids currently used leads to fading. These problems are only partially avoidable using sealed circuits. Moreover, the substitution of the hydraulic fluid and/or its disposal at the end of the car's lifetime is quite troublesome and expensive, since the hydraulic fluid may not simply be disposed and/or discharged into the environment, but has to be collected and destroyed according to very strict anti-pollution procedures. Finally, the need for connection pipes and/or hoses from the pressure generator (pump) to the actuator and/or caliper mostly may not be avoided, i.e. at least one big or alternatively, many small hydraulic circuits are needed, thus rendering the known by wire electro-hydraulic brake actuators very bulky and heavy and, therefore, not in compliance with the actual exigencies of car manufacturers.

For the purpose of at least partially overcoming the drawbacks affecting the electro-hydraulic by wire brake actuating devices, electro-mechanical by wire solutions have also been proposed in the past; in particular, these solutions were developed for the purpose of eliminating the hydraulic fluid from the actuators, thus improving the environmental characteristic of brake systems. However, developing electro-mechanical by wire actuating devices revealed to be a quite difficult task, essentially due to the fact that two very important technical issues had to be addressed. The first technical issue relates to the fact that the caliper or claw member must produce high forces (during strong braking actions, the forces are in the range of 20-50N). The second technical issue relates to the fact that the caliper must recover the wear of the brake pads, with this wear being in the range of 10-20 mm. It has, in fact, to be noted that high force levels are developed over short displacement ranges since the actuation range is comprised between 0.1 and 0.2 mm, whilst a relatively small amount of actuation energy is needed during each brake action. Moreover, the wear of the brake pads occurring till the brake pads are totally consumed and have to be substituted is comprised between 10 and 20 mm, this meaning that the wear and/or consumption of the brake pads has to be someway recovered and/or compensated by the braking system. However, even if the wear and/or the consumption range (10-20 mm) is large when compared to the actuation range (0.1-0.2 mm), the related wear recovery has to be guaranteed over a number of braking actions covering the whole operative life of the braking pads. This number is usually very large and corresponds to an extremely low average wear (in the range of 0.001-0.01 mm for each brake action).

Facing these two issues, the solutions using electro-mechanical actuators proposed in the past can be divided into two further subgroups of actuators, namely actuators using either ball-screws and/or epicyclic trains or not using ball-screws and/or epicyclic trains.

An example of a solution belonging to the first sub-group is given in document WO2005005854; in particular, the solution known from this document comprises an electric motor and an epicyclic train along with a pushing system to push the brake pads against the disk. Moreover, an electronic control unit drives the electric motor as a function of the commands of the driver and monitors the wear of the brake pads on the basis of information collected by sensors and relating either to the position of the brake pads and/or to the value of the motor current.

An example of a system belonging to the second subgroup cited above may be found in document U.S. Pat. No. 6,666, 308; in particular, the layout of the system known from this document differs from that of the system known from document WO 2005005854 and is based on the use of ball-screws in series with epicyclic trains.

It is appreciate that the solutions known from both documents WO 2005005854 and U.S. Pat. No. 6,666,308 allow to at least partially meet the technical requirements stated above, namely that of offering high force levels over short displacement ranges and that of allowing recovery of the wear of the braking pads. However, these solutions are affected by several drawbacks which render these solutions less attractive for applications in the automotive field. These drawbacks arise essentially from the use of both epicyclic trains and ball-screws; in fact, if, on the one hand, a big reduction gear ratio is obtained, on the other hand, the back-drive efficiency is very low, meaning that the brake pads are lifted away from the brake disk only very slowly. Moreover, other problems arise when these solutions are put into practice such as, for example, a relatively big weight, a high construction complexity, a corresponding high price and a somewhat higher failure rate. Moreover, a further problem affecting these solutions relate to the fact that their actuation is extremely noisy, thus rendering also these solutions less attractive for applications in the automotive field.

SUMMARY OF THE INVENTION

Accordingly, in view of the problems and/or drawbacks identified above, it is an object of the present invention to provide an actuating device for a wheel brake system of a motor vehicle and a brake system equipped with such an actuating device allowing to overcome the drawbacks affecting the prior art devices. Moreover, it is an object of the present invention to provide an actuating device for a wheel brake system of a motor vehicle allowing the transformation of a relatively big rotation in an extremely small displacement of the brake pads, thus offering a big reduction ratio. It is also an object of the present invention to provide an actuating system offering this big reduction ratio, but without all the problems affecting the prior art electromechanical devices, such as, for example, their big weight, high construction complexity, low-back drive efficiency or the like. A further object of the present invention is that of providing an actuating device allowing the recovery of the backlash arising with the brake pads wear. Still a further object of the present invention is that of providing an actuating device for a wheel brake system of a motor vehicle, allowing keeping separated the two phases of the brake actuation and the wear recovery.

According to the present invention, this is obtained by providing an actuating device for a wheel brake system of a motor vehicle comprising an electric motor and a cam element linked to said electric motor. The cam element allows the transformation of a relatively big rotation in an extremely small displacement; moreover, the high reduction ratio obtained allows the reduction of the design torque of the motor and then its size and weight. Still according to the present invention, the actuating device as proposed is adapted to automatically recover the backlash arising with the brake pads wear; since just one electric motor is needed, this solution allows keeping separate the two phases of the brake actuation and wear recovery.

In particular, according to the present invention, there is provided an actuating device in one embodiment, namely an actuating device for a wheel brake system of a motor vehicle, wherein said wheel brake system comprises at least a friction element adapted to be connected to a vehicle wheel and at least one brake lining adapted to be pressed against and lifted away from said at least one friction element, said actuating device comprising an electric motor along with rotatable means adapted to be rotated by said electric motor. The actuating device further comprises a displaceable actuating member adapted to actuate said at least one brake lining, thus pressing it against said at least one friction element. Moreover, said rotatable means comprise a rotatable element with a surface abutting against said actuating member so that rotation of said element in a first rotation sense results in said actuating member being displaced along a first actuating direction, thus actuating said at least one brake lining and pressing it against said at least one friction element.

Moreover, according to the present invention, there is provided an actuating device in another embodiment, namely an actuating device comprising a support frame and fixing means for fixing the electric motor to said frame, wherein said fixing means comprise displaceable means adapted to be displaced along a second predefined direction, the displacement of said displaceable means along said second predefined direction resulting in said motor being displaced along a third predefined direction substantially perpendicular to said second predefined direction and substantially parallel to said first actuating direction.

Still according to the present invention, there is provided an actuating device of yet another embodiment, namely an actuating device comprising displacing means adapted to displace said displaceable means along said second predefined direction, with said displacing means being actuated by said electric motor.

There is also provided a braking system for a motor vehicle in another embodiment, namely a braking system comprising at least a friction element adapted to be connected to a wheel of a vehicle and at least one lining element adapted to be pressed against and lifted away from said at least one fixing member, with said braking system being equipped with an actuating device according to the present invention.

Further embodiments and/or details of the present invention are defined in the dependent claims.

As will become more apparent with the following disclosure, the principle on which the present invention is based relates to the fact that the rotation of a rotatable element fixed to an electric motor (for instance a rotatable cam element with a cam surface or an eccentric element) is used for obtaining the displacement of an actuating member abutting against said actuating member, the displacement of said actuating member being in turn used for obtaining the desired displacement of the braking pads, resulting in said braking pads being pressed against the brake disk. The rotating element allows the transformation of a relatively big rotation in an extremely small displacement, i.e. a big reduction ratio is obtained. Moreover, this big reduction ratio is obtained without all the problems affecting the mechanical and/or electromechanical devices known in the art. Moreover, the high reduction ratio obtained allows the reduction of the design torque of the motor and then its size and weight. The present invention is also based on the consideration that the two phases of the braking actuation and the wear recovery may be kept separated; in particular, the inventors of the present invention came to the conclusion that these two phases may be kept separated still using just one electric motor so as not to lose the advantages relating to the reduced size and weight of the actuating device. In particular, the inventors of the present invention came to the conclusion that if the electric motor and the rotatable element may be displaced at the end of each brake action, the brake pads may be kept in proximity of the brake disk and at a short distance, thus allowing the wear recovery without producing an unwanted braking action. This is the reason why, according to the present invention, means are provided for displacing the electric motor at the end of each brake action, so as to keep the brake pads at the desired distance from the brake disk. Moreover, the inventors of the present invention came to the conclusion that this important result may be obtained either by providing independent displacing means in combination with the motor or by exploiting the rotation of the motor, in particular the reverse torque arising at the end of each brake action.

BRIEF DESCRIPTION OF THE DRAWINGS

In the following, a description will be given with reference to the drawings of particular and/or preferred embodiments of the present invention; it has, however, to be noted that the present invention is not limited to the embodiments disclosed but that the embodiments disclosed only relate to particular examples of the present invention, the scope of which is defined by the appended claims; in particular, in the drawings:

DETAILED DESCRIPTION OF THE PREFERRED EMBODIMENTS

While the present invention is described with reference to the embodiments as illustrated in the following detailed description as well as in the drawings, it should be understood that the following detailed description as well as the drawings are not intended to limit the present invention to the particular illustrative embodiments disclosed, but rather that the described illustrative embodiments merely exemplify the various aspects of the present invention, the scope of which is defined by the appended claims.

As apparent from the disclosure given above, the present invention is understood to be particularly advantageous when used for application in the automotive field; in particular, the present invention is understood to be particularly advantageous when applied to the actuating device of a wheel brake system of a vehicle. For this reason, examples will be given in the following in which corresponding embodiments of the actuating device according to the present invention are described in combination with the brake pads and the brake disk of a brake system and are used to press said brake pads against a said brake disk. However, it has to be noted that the present invention is not limited to the particular case of an actuating device for a wheel brake system of a vehicle, but can be used in any other situation in which a rotation has to be transformed into a lateral displacement and/or in all those situations in which elements subjected to consumption and/or wear have to be moved, so that the need arises of recovering said wear. Accordingly, it will become apparent from the following disclosure that the present invention may also be used for other automotive applications, for example, in combination with steering, clutch, gear shift and similar systems. Moreover, it will become apparent from the following disclosure that the present invention is not limited to automotive applications. It has, therefore, to be understood that the present invention is applicable for transforming the rotation of a rotatable element into the lateral displacement of a displaceable element abutting against said rotatable element in all those cases in which a big reduction ratio is requested and in all those applications in which said displaceable element is for moving moveable elements subjected to wear and/or consumption.

Figure 1:
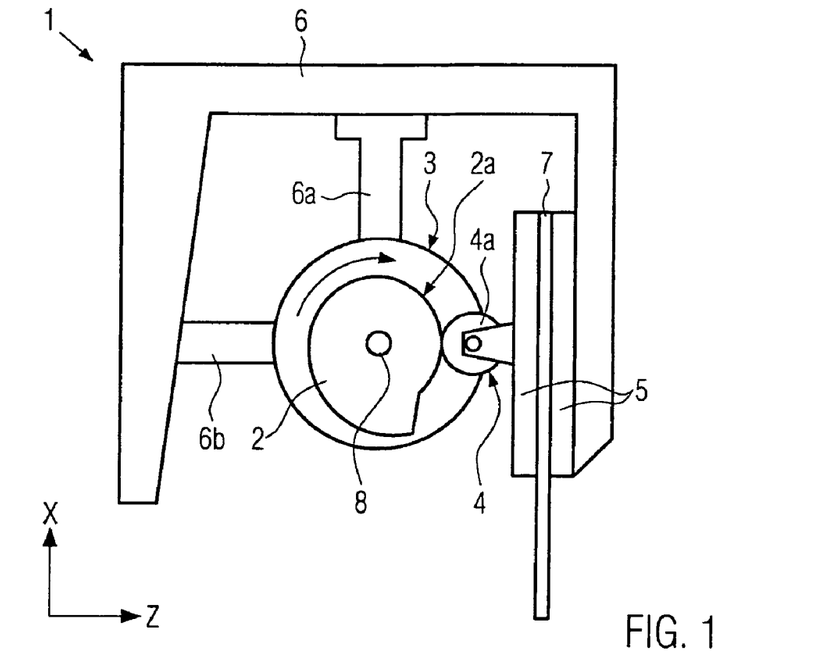
FIG. 1 relates to a side view of a first embodiment of the actuating device according to the present invention.

FIG. 1 schematically depicts an actuating device (in the following also referred to as actuator) according to a first embodiment of the present invention; in particular, in FIG. 1, said actuator is identified by the reference numeral 1 whilst reference numeral 3 identifies an electric motor comprising a rotatable shaft 8. Moreover, in FIG. 1, reference numerals 7 and 5 identify a friction element (brake disk) and two brake pads or linings, respectively, belonging to a wheel brake system of a vehicle, with both said wheel and said vehicle being not depicted in FIG. 1 for reasons of clarity. Further depicted in FIG. 1 are a frame 6 and securing and/or fixing means 6a and 6b adapted to secure the motor 3 to the frame 6. Moreover, reference numeral 2 identifies a cam element fixed and/or locked to the rotatable shaft 8, with said rotatable cam element comprising a cam surface 2a. Finally, reference numerals 4 and 4a identifies an actuating element.

In the actuating device 1 of FIG. 1, the actuating member or element 4 is adapted to be displaced and/or reciprocated along the direction Z; displacing the displacing member or actuating element 4 along the direction Z results in one or both of the braking elements or brake pads or linings 5 being pressed again and lifted away from the friction element or brake disk 7. To this end, devices may be provided in combination with the displacing member or actuating member 4 adapted to press both braking elements 5 against the friction element 7 and to lift both braking elements 5 away from said friction element 7. For instance, said means may comprise a caliper or a claw member of the kind only used in prior art braking systems. Said means, however, do not fall within the scope of the present invention and are not described in more detail, accordingly. For the purpose of better understanding the operation of the device depicted in FIG. 1 the axis of rotation of the brake disk or friction element 7 is assumed to be parallel to the direction Z. The displacement of the actuating member 4 along the direction Z is obtained through a rotation of the rotatable element 2 in the direction identified by the arrows. In fact, as apparent from FIG. 1, the rotatable element 2 comprises a cam surface 2a, abutting against the actuating member 4. Moreover, the rotatable element 2 is fixed to the shaft 8 of the motor 3. It results, therefore, that during rotation of the rotatable element 2 in the direction identified by the arrow in FIG. 1, a lateral force is exerted against the actuating member 4, which is therefore displaced in the direction Z. For the purpose of allowing the rotatable element to laterally displace the actuating member 4, the motor 3 is secured to the frame 6 by means of securing elements or means 6a and 6b; in particular, said securing elements or means 6a and 6b are provided for the purpose of avoiding the motor 3 to be displaced in the direction X and to be rotated in the circumferential direction of the disk 7. Additionally, said securing means or members are provided for the purpose of avoiding rotation of the stator of the motor 3 when a torque is applied to the rotatable shaft 8. Also the actuating member 4 may be provided with a rotating member 4a abutting against the cam surface 2a of the rotatable cam element; in particular, such a rotatable element 4a allows the reduction of vertical (in the direction X) forces exerted by the cam element 2 on the actuating member 4 thus allowing a more useful transformation of the rotation of the rotatable cam element 2 into a lateral displacement (in the direction Z) of the actuating member 4.

The principle of working of the actuating device 1 schematically depicted in FIG. 1 may be summarized as follows. In the absence of a braking request, the rotatable cam element 2 and the actuating member 4 are kept in a standby and/or home position, with the cam surface 2a of the cam element 2 being kept either in slight contact with or in close proximity to the actuating member 4a. As soon as the need arises for a brake action, the electric motor 3 is energized, for instance as a result of a pressure exerted by the driver of the vehicle on the brake pedal (not depicted in FIG. 1); as a result of the electrical current flowing through the electric motor 3, the shaft 8 is rotated, together with the rotatable cam element 2 in the direction of the arrows in FIG. 1. Accordingly, the actuating member 4a is pushed by the rotatable element 2 and laterally displaced, namely in the direction Z in FIG. 1. In this way, the two braking elements or pads 5 are pushed against the friction element 7 so as to exert a braking action on it and, accordingly, on the wheel of the vehicle. It appears clearly that the force exerted by the rotatable cam element 2 on the actuating member 4a (and thus the force exerted by the braking element or pads 5 on the friction element 7) will be some way proportional to the angle reached by the rotatable cam element 2 mounted on shaft 8. Moreover, the braking force can be directly controlled by introducing current control on the electric motor 3. At the end of the braking phase, namely as soon as no further pressure is exerted by the driver on the brake pedal, the rotatable cam element 2 is rotated back (i.e. in a direction contrary to the arrow in FIG. 1) and the actuating member 4a is also displaced back until the rotatable cam element 2 and the actuating member or element 4a reaches the standby position. The back rotation may be obtained as a consequence of the elastic forces generated during the braking action or, as an alternative and according to the circumstances, said back rotation may be helped by the application of an inverse torque by the electric motor 3 or by the introduction of a spring.

The actuating system 1 of FIG. 1 allows to overcome the problems affecting the prior art actuating devices; in fact, it can be appreciated that the rotatable cam element 2 allows the transformation of a relatively large rotation in an extremely small displacement (i.e. a big reduction ratio is obtained). Moreover, this large reduction ratio is obtained without all the problems affecting the prior art electromechanical devices, such as, for example, low back-drive efficiency, relatively big weight and high construction complexity. The rotatable cam element 2 is linked to an electric motor which may be controlled, according to the circumstances, by a power electronic and an electronic control unit. Moreover, the high reduction ratio obtained allows the reduction of the design torque of the motor and then its size and weight.

Of course, many amendments and/or modifications may be introduced into the actuating device as disclosed above with reference to FIG. 1, without departing from the scope of the present invention; for instance, according to the circumstances, the rotatable cam element 2 depicted in FIG. 1 may be substituted with an eccentric rotatable element, i.e. with a rotatable element eccentrically fixed to the shaft 8 of the motor 3. This solution could, in particular, simplify the construction and reduce the cost even if it could require an electric motor of a larger size.

As stated above, a modern brake actuator has to be able to recover the backlash arising due to the brake pads wear and/or consumption, in order to meet the exigencies and requirements of the car manufacturers. An example of an actuating device according to the present invention allowing to adequately recover and/or compensate for the backlash will be disclosed in the following with reference to FIG. 2, wherein component parts already disclosed with reference to FIG. 1 are identified by the same reference numerals.

Figure 2:
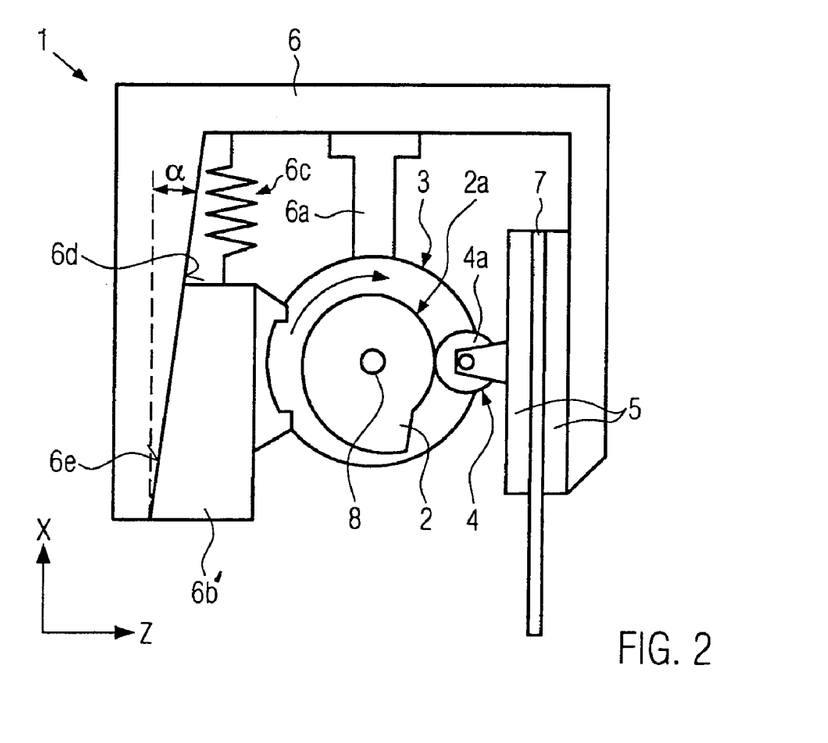
FIG. 2 relates to a side view of a further embodiment of the actuating device according to the present invention.

With respect to the actuating device of FIG. 1, the actuating device of FIG. 2 additionally comprises displaceable means 6b' through which the motor 3 is secured to the frame 6 and displacing means 6c adapted to displace said displaceable means 6b'. Moreover, in FIG. 2, reference numerals 6d and 6e identify two facing sliding surfaces, provided on the frame 6 and the displaceable means 6b', respectively. In the embodiment depicted in FIG. 2, the displaceable means 6b' comprises a slide element; on the one side (the right side in FIG. 2), the slide element 6b' is kept into abutment with a corresponding abutment surface on the motor 3 whilst, on the opposite side (the left side in FIG. 2), the sliding surface 6e of the slide element 6b' is kept into abutment with a corresponding, facing surface 6d of the frame 6, in such a way that the sliding surface 6e may slide on the surface 6d of the frame 6, during displacement of the slide element 6b' in the X direction (the vertical direction in FIG. 2). Moreover, the displacing means 6c comprises a resilient element, for instance a resilient spring and are adapted to displace the slide element 6b in the vertical direction as it will be explained in more detail below. Displacing the slide element 6b' along the X direction results in the motor 3 being laterally displaced together with the rotatable element 2 in the Z direction in FIG. 2. Additional securing means 6a are further provided in the embodiment of FIG. 2 for fixing the electric motor 3 to the frame 6; in particular, these securing means 6a are such as to constrain the electric motor 3 in the X direction. Accordingly, in the embodiment of FIG. 2, the motor 3 and the rotatable element 2 may not be displaced in the X direction (even not during displacement in the same direction of the slide element 6b') whilst the motor 3 may be displaced in the Z direction, i.e. in the actuating direction of the actuating member 4.

During the braking phase, the actuating device of FIG. 2 works in a way similar to that of the actuating device disclosed above with reference to FIG. 1; that is, as soon as a braking action is requested (for instance, due to a pressure exerted by the driver on a brake pedal), the rotatable element 2 is rotated as indicated by the arrow in FIG. 2 and the actuating member 4 is displaced in the Z direction, thus resulting in the braking pads 5 being pressed against the friction element (brake disk) 7. In the same way, the backward rotation of the rotatable element 2 and the backward displacement of the actuating member 4 till their standby position is reached are similar to those of the actuating device of FIG. 1. However, in the absence of any braking action, a backlash recovery step is carried out, so as to compensate the backlash arising in the actuating device 1, due to the wear of the brake pads or braking elements 5 and/or friction element 7. This is due to the fact that in the absence of any braking action, and thus in the absence of any brake force acting in the direction Z, the spring 6c pulls the slide element 6b' in the X direction; accordingly, as a result of the slope of the slide element 6b' and the frame 6 (angle α), the motor 3 is displaced together with the cam element 2 in the Z direction, till the cam surface 2a of the rotatable element 2 is brought into light contact with the actuating member 4, eventually comprising a rotatable actuating element 4a; therefore, also the brake pads or friction elements 5 are brought into light contact with the friction element 7. However, the stiffness and preload of the spring 6c may be designed so as to allow a displacement of the motor 3 in the Z direction with an adequate recovery of the backlash, but without producing an unwanted braking action. On the contrary, during the braking phase, the brake forces acting in the Z direction locks the slide against the sliding surface 6d of the frame thus avoiding any displacement of the slide 6b due to the pulling action of the resilient spring 6c.

The actuating device as depicted above with reference to FIG. 2, even if based upon a quite simple concept, has been revealed to be particularly useful for the purpose of allowing an adequate recovery of the backlash; this is in particular due to the fact that the braking phase and the recovery phase are kept separate, with the result that the slide and, correspondingly, the motor 3 and the rotatable element 2, may only be displaced outside of the braking phase, since, during the braking phase, the lateral forces arising lock the slide against the surface 6d. Of course, also in the case of the embodiment of FIG. 2, many amendments or modifications may be introduced according to the circumstances; for instance, the backward rotation of the motor 3 and the rotatable cam element 2 may be obtained either as a result of the inverse torque arising or through the application of an inverse torque by the electric motor 3. Moreover, also in this case, the cam element 2 may be substituted with an eccentric element. Finally, the braking force can be directly controlled introducing a current control on the electric motor 3.

In the following, further embodiments of the present invention will be described with reference to FIGS. 3a and 3b, wherein, as usual, component parts already described with reference to previous figures are identified by the same reference numerals.

Figure 3A:
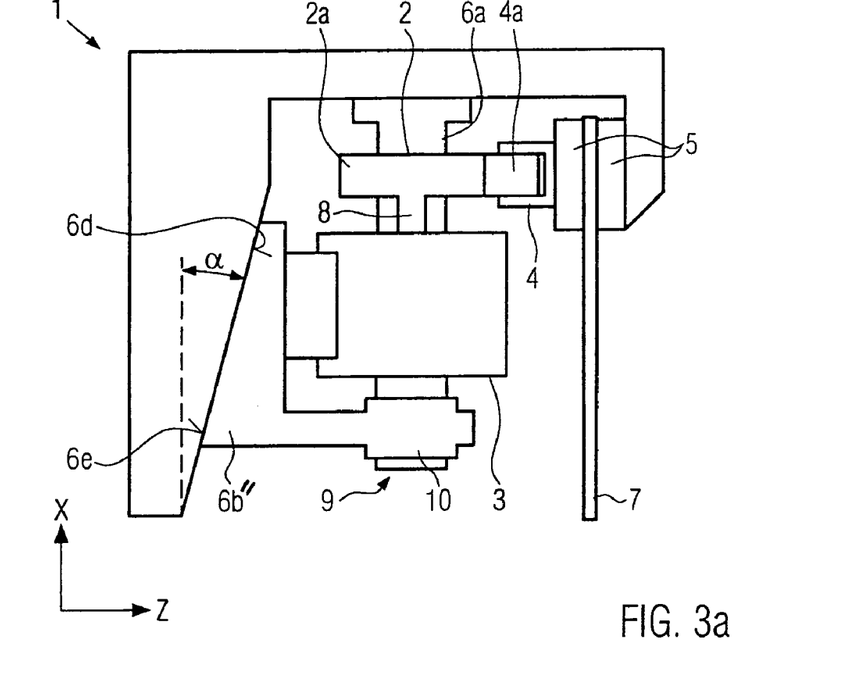
FIGS. 3a and 3b relate to corresponding top views of further embodiments of the actuating device according to the present invention.

The most important difference between the actuator of FIGS. 3a and that of FIG. 2, relates to the fact that, in the actuator of FIG. 3a, the recovery of the backlash is obtained through an efficient exploitation of the rotation of the motor 3, in particular of the reverse torques arising. To this end, the braking means 1 of FIG. 3a comprise a screw element 9 received in a corresponding, threaded nut element 10 firmly fixed to the slide 6b". Accordingly, in the actuator of FIG. 3a, the slide 6b" is displaced in the X direction as a result of the rotation of the screw element 9 as it will be disclosed in more detail in the following.

During the braking phase, the actuator of FIG. 3a behaves just as that of FIG. 2b; accordingly, also in the embodiment of FIG. 3a, the rotatable shaft 8 of the electric motor 3 is linked to a rotatable cam element 2 with an abutting surface abutting against an actuating member 4, eventually also comprising a rotatable actuating element 4a. Accordingly, as a result of the rotation of the rotatable cam element 2, the actuating member 4 is laterally displaced so that the friction elements or braking pads 5 are pushed against the friction element 7, whilst, during backward rotation of the rotatable cam element 2, the friction element or braking pads 5 are lifted away from the friction element 7. Moreover, also in the braking means 1 of FIG. 3a, the cam and the motor are constrained along the axis of the motor, i.e. in the X direction in FIG. 3a; however, the motor 3 can be displaced together with the rotatable cam element 2 in the Z direction as a result of the displacement of the slide 6b" in the X direction. In the embodiment of FIG. 3a, the screw element 9 is locked and/or firmly fixed to the stator of the motor 3; alternatively, the screw or threaded element 9 may even be part of the stator of the motor 3. During the braking phase, i.e. during rotation of the rotatable cam element 2 in the forward direction, the stator of the motor would tend to be rotated in the backward direction as a result of the reverse torque arising; however, the slope of the slide 6b" (the angle α) and the interface between the stator of the motor and the slide 6b" are designed in such a way that during the braking phase, the slide 6b" is locked due to the resulting pressure exerted by the slide 6b" on the surface 6d of the frame 6, so that the stator of the motor 3 can not rotate. That is to say that the slope of the slide 6b" is designed in such a way that during the braking phase, the force acting on the bolt element 10 and between the stator of the motor 3 and the slide 6b" as a result of the reverse torque arising, will not be sufficient to displace the slide 6b" in the X direction in FIG. 3a. At the end of the braking phase, the rotatable cam element 2 is rotated in the backward direction (i.e. in the direction contrary to the direction identified by the arrow in FIG. 2), either due to the resulting reverse torque or due to the application of an inverse rotation by the electric motor 3. In particular, during its backward rotation, the rotatable cam element 2 is brought back to its standby or home position where it is locked by means of a back locking device (not depicted in FIG. 3). As soon as the rotatable cam element 2 reaches the home position (and is, therefore, locked in this position by the back locking device) a reverse torque arises, rotating the stator of the motor and the threaded element 9 in the forward rotating direction. Accordingly, since during this phase no lateral forces are exerted, the rotation of the screw element 9 inside the nut or bolt element 10 will result in a displacement of the slide 6b" in the X direction. It appears, therefore, clearly that the motor group comprising the motor and the rotatable element will be displaced in the Z direction as a result of the approaching of the slide element 6b". The rotatable cam element 2 will, therefore, be brought into abutment with the actuating member 4 and the brake pads 5 will be brought in light contact with the friction element 7. However, also in this case, the slope of the slide 6b" (and/or of the sliding surface 6d of the frame 6) may be designed so as to allow the displacement of the motor group into the Z direction and the resulting backlash recovery, without producing an unwanted braking action.

Figure 3B:
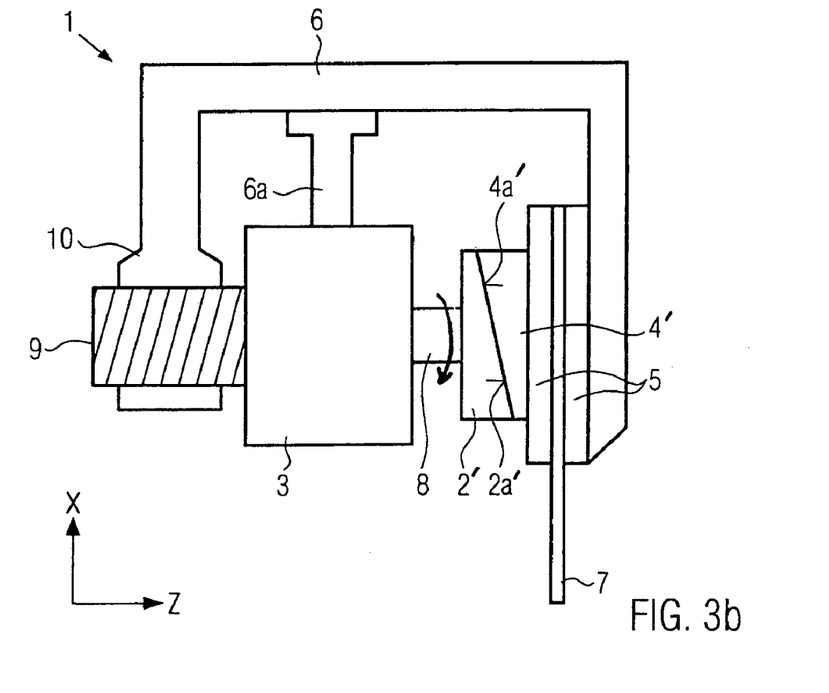

The embodiment of FIG. 3b behaves as that of FIG. 3a, the main difference between the two embodiments relating to the fact that, in that of FIG. 3b, an axial cam is adopted. The rotatable shaft 8 of the electric motor 3 is linked to a rotatable element 2' with an abutment surface 2a' abutting against a corresponding surface 4a' of an actuating member 4'. Accordingly, as a result of the rotation of the rotatable element 2' in the rotating sense indicated by the arrow in FIG. 3b, the actuating member 4' is laterally displaced so that the braking pads 5 are pushed against the friction element 7, whilst, during backward rotation of the rotatable element 2', the braking pads 5 are lifted away from the friction element 7. The motor 3 can be displaced together with the rotatable element 2' in the Z direction as a result of the rotation of the stator of the motor. To this end, in the embodiment of FIG. 3b, the screw element 9 is locked and/or firmly fixed to the stator of the motor 3; alternatively, the screw or threaded element 9 may even be part of the stator of the motor 3. During the braking phase, i.e. during rotation of the rotatable element 2' in the forward direction indicated by the arrow, the stator of the motor would tend to be rotated in the backward direction as a result of the reverse torque arising; however, the pitch of the screw element 9 and its diameter are designed in such a way that during the braking phase, the stator of the motor 3 is locked due to the friction torque produced between the screw 9 and the nut 10. That is to say that the screw 9 and the nut 10 are designed in such a way that during the braking phase, the force acting on the actuating member 4', will induce a friction torque between the screw 9 and the nut 10 that avoids all rotations of the stator of the motor 3. At the end of the braking phase, the rotatable element 2' is rotated in the backward direction (i.e. in the direction contrary to the direction identified by the arrow in FIG. 2), either due to the resulting reverse torque or due to the application of an inverse rotation by the electric motor 3. In particular, during its backward rotation, the rotatable element 2' is brought back to its standby or home position where it is locked by means of a back locking device (not depicted in FIG. 3b). As soon as the rotatable element 2' reaches the home position (and is, therefore, locked in this position by the back locking device) a reverse torque arises, rotating the stator of the motor and the threaded element 9 in the forward rotating direction indicated by the arrow. Accordingly, since during this phase no forces in the axial direction of the screw (Z direction) are exerted, the rotation of the screw element 9 inside the nut or bolt element 10 will be possible and will result in a displacement of the motor together with the rotatable element 2' in the Z direction. The rotatable element 2' will, therefore, be brought into abutment with the actuating member 4' and the brake pads 5 will be brought in light contact with the friction element 7. However, also in this case, the pitch and the diameter of the screw 9 and nut 10 may be designed so as to allow the displacement of the motor group into the Z direction and the resulting backlash recovery, without producing an unwanted braking action. An alternative embodiment could exploit a torsional spring of appropriate preload and stiffness to generate the torque on the stator of the motor 3 to produce its rotation during the backlash recovery phase.

The advantages offered by the embodiments depicted above with reference to FIGS. 3a and 3b with respect to the previous embodiments as depicted with reference to FIGS. 1 and 2 relate to the fact that the embodiments of FIGS. 3a and 3b allow an active control of the pads wear recovery phase, meaning that the force displacing the motor 3 and the rotatable element 2' is now controlled and kept constant over the whole backlash recovery phase and over all the wear range. Moreover, concerning possible modifications of the actuators of FIGS. 3a and 3b, the same considerations apply as pointed out with respect to the two previous embodiments. Accordingly, as stated above, the rotation of the rotatable element 2' in the backward direction may be obtained through application of an inverse torque by the electric motor. Moreover, also in this case, an eccentric element may be used instead of the cam element. Furthermore, since in the present case, the motor stator can rotate, some special kind of electric connections may be used. Finally, with reference to the embodiment of FIG. 3a, adequate securing means 6a may be used to constrain the motor group along the axis of the motor, i.e. in the X direction in FIG. 3a.

In the following, still a further example of an electromechanical actuator adapted to be exploited in the electromechanical module according to the present invention will be described with reference to FIG. 4; again, component parts depicted in FIG. 4 and already described with reference to previous figures are identified by the same reference numerals.

Figure 4:
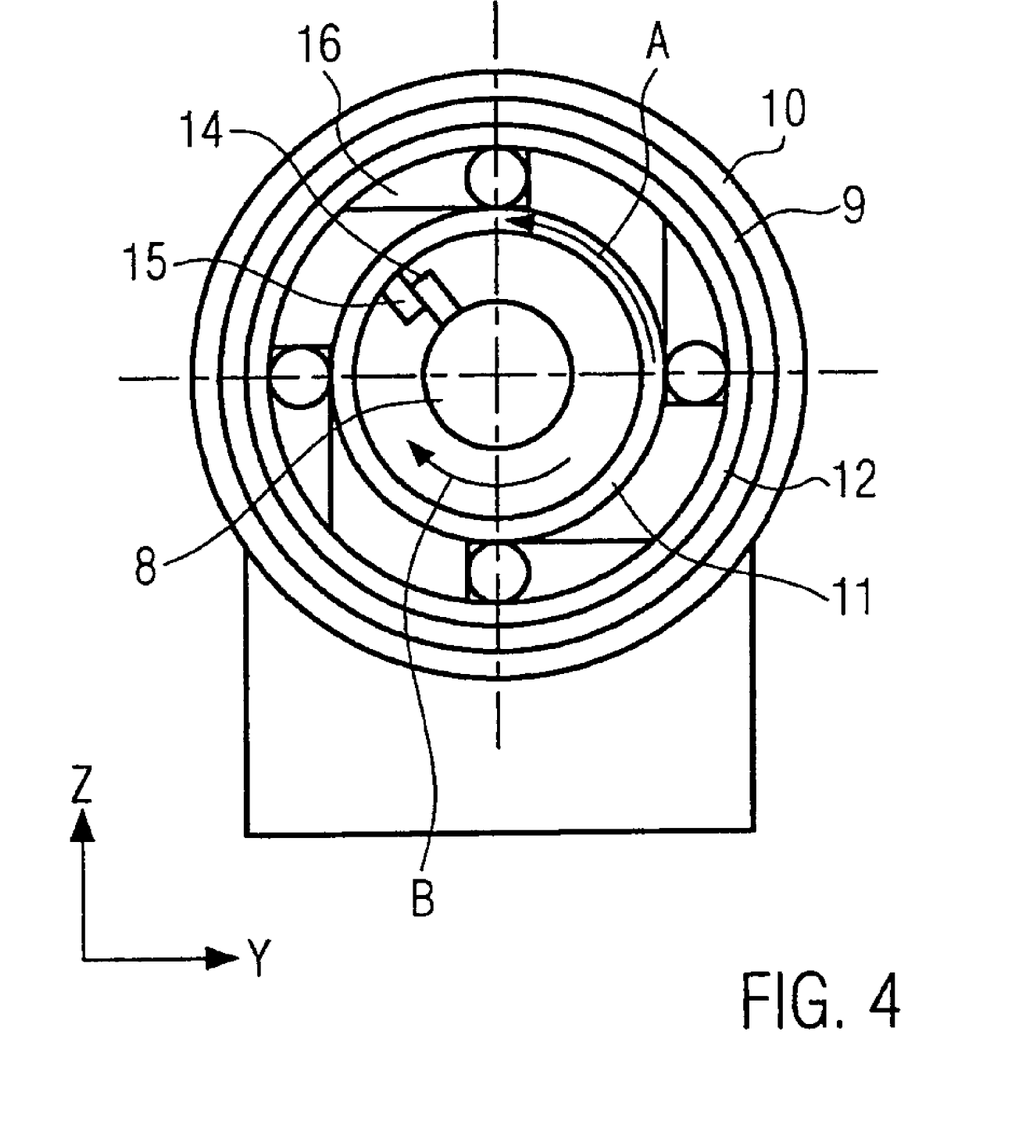
FIG. 4 relates to a rear view of a further embodiment of the actuating device according to the present invention.

In FIG. 4, only the motor group of the electromechanical actuator and/or braking means is depicted whilst other component parts such as, for instance, the frame supporting the motor group, the slide to be used in combination with the motor group, as well as the rotatable element, the abutting actuating element, the brake pads and the friction element are omitted for reason of clarity; however, it has to be understood that the motor group of FIG. 4 is adapted to be implemented in an actuator as depicted in FIGS. 3a and 3b, i.e. in combination with those component parts depicted therein. Moreover, it has also to be noted that in FIG. 4, there is depicted a back view of the motor group, i.e. a view of the back side, opposite to the side where the rotatable element is provided. When the motor group of FIG. 4 is implemented in an actuator, for instance in the actuators of FIGS. 3a and 3b, the resulting brake phase is similar to the brake phase as disclosed above with reference to FIGS. 3a and 3b; that is to say that the braking result is obtained through rotation of the rotatable element fixed to the shaft 8, and the corresponding displacement of the actuating member resulting in a corresponding pressure being exerted by the braking pads on the friction element. However, the motor group of FIG. 4 differs from that of FIG. 3, in the way the backlash recovery is executed; in fact, whilst the backlash recovery phase is still based on the exploitation of the rotation of the motor (either of the case or of the stator), in the present case, the motor case cannot be rotated, while the screw element 9 is free to rotate relative to it. To this end, a free wheel 16 is interposed between the shaft 8 and the screw element 9, with this free wheel 16 comprising an inner ring 11 and an outer ring 12. Moreover, the expression "free wheel" has to be understood as meaning that the inner ring 11 may be freely rotated with respect to the outer ring 12 in the rotating direction B or, in other words, that when the inner ring 11 is rotated in the direction B, the outer ring 12 is not rotated; on the contrary, when the inner ring 11 is rotated in the backward rotating direction A, also the outer ring is rotated in the same backward rotating direction A. Furthermore, the outer ring 12 is firmly fixed and/or locked to the screw 9, which, in turn, is received inside the nut 10. As depicted in FIG. 4, the motor shaft 8 comprises a first key or protruding portion 14 fixed to the motor shaft 8 and adapted to cooperate with a second key or latching element 15 of the inner ring 11. As it will become more apparent with the following description, the purpose of the latching member 15 is that of allowing the outer ring to be rotated by the rotating shaft 8 in the backward rotating direction A.

Figure 4A:
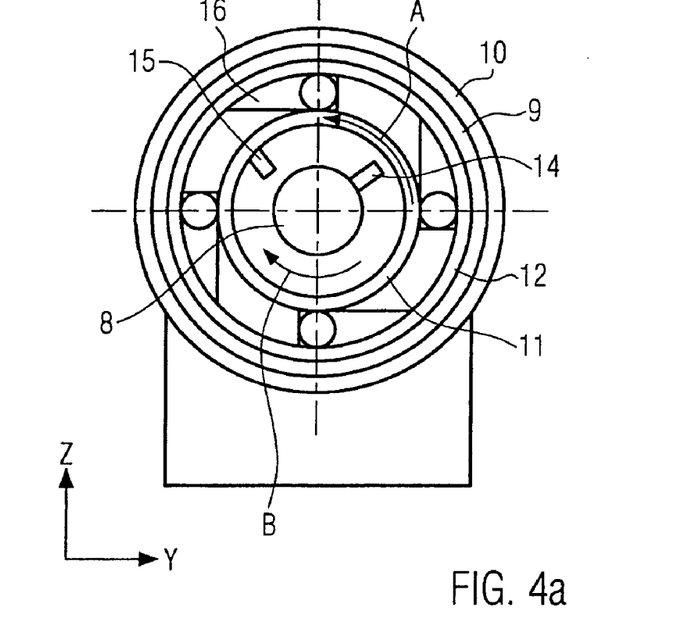
FIGS. 4a to 4c relate to rear views of the embodiment depicted in FIG. 4 of the actuating device according to the present invention, during corresponding operation steps of this actuating device.
Figure 4B:
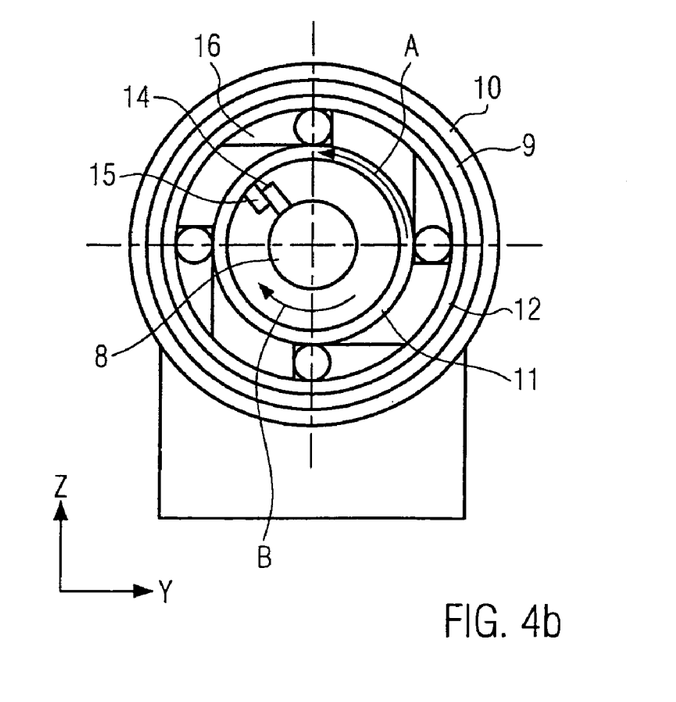
Figure 4C:
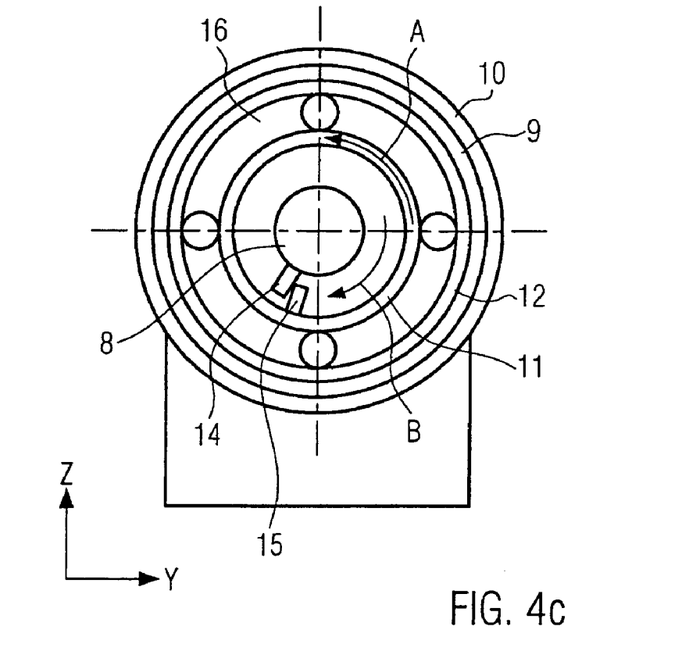

The function of the motor group of FIG. 4 and, therefore, the functioning of a corresponding electromechanical actuator implementing this motor group will be described in the following with respect to FIGS. 4 and 4a to 4d. During the braking phase, the behavior of an actuator implementing the motor group of FIG. 4 is similar to that of the actuator disclosed above with reference to FIGS. 3a and 3b; accordingly, during the braking phase, the rotatable element (not depicted in FIGS. 4 and 4a to 4d) is rotated in the direction of rotation identified in FIG. 4 by the arrow B so that the actuating member (also not depicted) is laterally displaced and the braking pads are pushed against the friction element; during the braking phase, the motor group is not displaced due to the friction forces arising. At the beginning of the braking phase, the protruding portion 14 and the latching element 15 are reciprocally disposed in the position depicted in FIG. 4 with this position corresponding to the standby or home position of the rotatable element. As soon as a braking action is requested, a corresponding braking phase is started meaning that the shaft 8 is rotated, together with the rotatable element in the direction of the arrow B; accordingly, neither the inner ring 11 nor the outer ring 12 are rotated since no action is exerted by the protruding portion 14 on the latching means 15. In other words, at the beginning of the braking phase and during the braking phase, neither the inner ring 11 nor the outer ring 12 are rotated either in the direction of the arrow B or in the contrary direction, so that no rotating impulses are given to the screw element 9 firmly fixed to the outer ring 12. The position assumed by the rotating shaft 8 and the inner ring 11, in particular the reciprocal position assumed by the protruding portion 14 and the latching means 15 at the end of the braking phase is depicted in FIG. 4a; in particular, as apparent from FIG. 4a, at the end of the braking phase, the latching member 15 is still in the position assumed at the beginning of the braking phase (home position). As soon as the braking phase is finished or stopped, the motor shaft 8 is rotated in a backward direction, i.e. in the direction A contrary to that identified by arrow B. Accordingly, the latching member 15 is not engaged by the protruding portion 14 until the protruding portion 14 reaches again its home position (see FIG. 4b): That means that solely the shaft 8 is rotated in the direction A until the protruding portion 14 reaches its home position (see FIG. 4b). However, as soon as the rotating shaft 8 (and the protruding portion 14) reaches again the home position, any further rotation of the shaft 8 in the direction A produces an engagement of the protruding portion 14 with the latching means 15 resulting therefore in the inner ring 11 being also rotated in the backward direction A (see FIG. 4c). Moreover, also the outer ring 12 is rotated in the backward direction A the same amount of the inner ring 11 due to the action of the free wheel. Accordingly, also the screw element 9 is rotated in the backward direction A so that the nut threaded element 10 receiving said screw element 9 is displaced in a sense that approaches the motor cam group to the frame so that a backlash recovery is carried out. The position assumed by the rotating shaft 8, in particular by the protruding portion 14 and the latching member 15 at the end of the backlash recovery phase is that depicted in FIG. 4c.

Figure 4D:
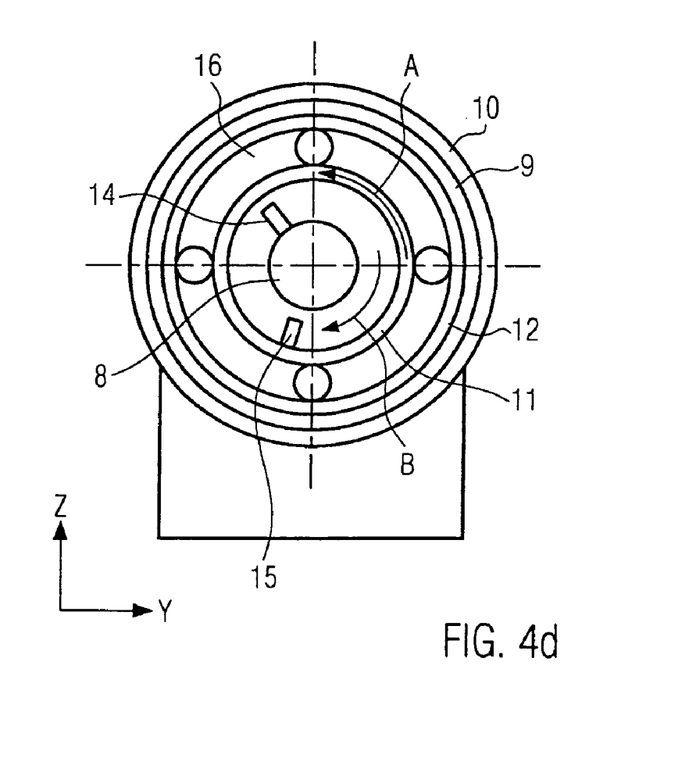

As soon as the backlash recovery phase has been completed the shaft 8 is rotated again in the forward direction B until the shaft 8 and the protruding portion 14 reach again the home position (see FIG. 4d). Moreover, during this further forward rotation of the shaft 8 not solely the shaft 8 is rotated although no action is exerted by the protruding portion 14 on the latching member 15; on the contrary, also the inner ring 11 is rotated in the forward direction B by means of resilient means such as a spring (not depicted in the figures) until the inner ring 11 also reaches the home position with the protruding portion 14 and the latching member 15 being again reciprocally disposed as depicted in FIG. 4, thus preparing the motor-cam group for a new braking phase and a new recovery phase.

In the following, with respect to FIG. 5, a possible layout of a braking system implementing and/or exploiting an actuating device according to the present invention will be disclosed; as usual, in FIG. 5, those component parts already disclosed with reference to previous claims, are identified by the same reference numerals.

Figure 5:
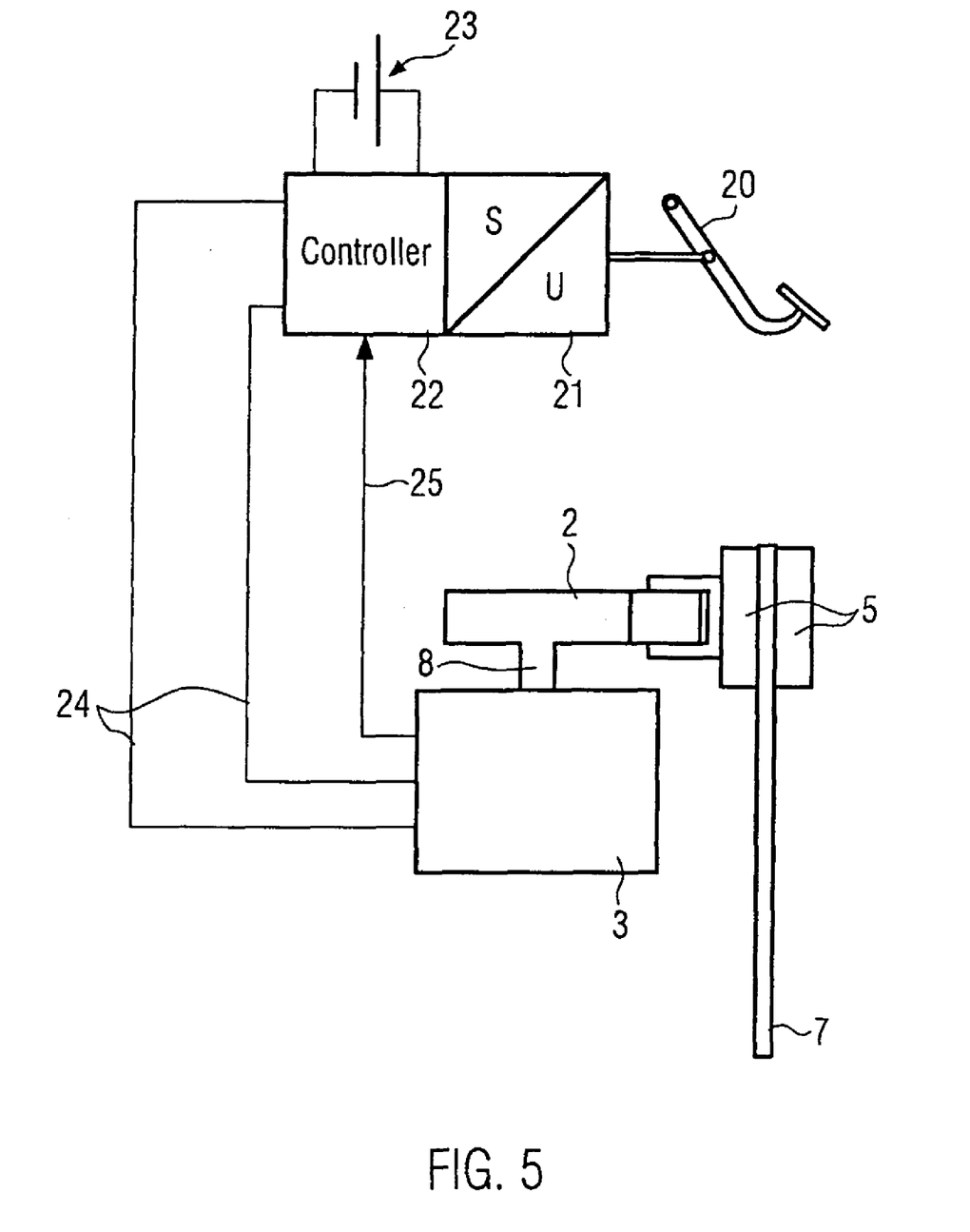
FIG. 5 relates to a schematic view of a braking system according to the present invention.

The braking system of FIG. 5 comprises a brake pedal 20 adapted to be actuated by a driver; moreover, the braking system comprises an actuating unit 21 (for instance, a measuring transducer) and a control unit 22 connected to the actuating unit 21. Moreover, the system comprises a power source, for instance a current or voltage source like a vehicle battery 23 and electrical connections 24, connecting the control unit 22 to the motor 3. Finally, the system also comprises sensing means 25 adapted to collect signals from the motor 3 and to provide the control unit 22 with said signals. The actuating unit 21 is adapted to generate signals as a function of the movement of the brake pedal 20, resulting from a pressure exerted by the driver on said pedal 20. These actuating signals are sent to the control unit 22; this control unit 22 may process the signals received from the actuating unit 21 so that corresponding electrical signals are generated and sent to the electric motor 3. For instance, said electrical signals may cause the rotatable element to be rotated either in the forward or backward direction; moreover, said signals may also relate to the speed of rotation of said rotatable element 2. The sensing means 25 are provided for the purpose of controlling the functioning of the motor 3 so that corresponding counter signals may be generated and forwarded to the motor 3, as a function of the signals and/or data collected by the sensing means 25. For instance, the signals and/or data collected may relate to the heat generated by the motor so as to avoid malfunctioning of the same.

In conclusion, the actuating device according to the present invention allows obtaining a very efficient braking action, together with adequate backlash recovery or adjustments due to wear of the brake pads or friction element. In particular, the actuating device according to the present invention allows to overcome the drawbacks affecting the electro-hydraulic brake actuating device; this is due to the fact that the system according to the present invention is an electro-mechanical one, so that there is no need for any hydraulic circuit (neither long nor short) so that the causes of possible failure are reduced together with the construction complexity of the device. Moreover, the absence of hydraulic fluid improves the environmental characteristics of the actuating device and, therefore, those of the vehicle exploiting said device. Due to the solution adapted for the braking phase (rotating cam and/or eccentric element), the motor actuation stroke is really short allowing fast actuation in case of need, for instance, when used in combination with a ABS system.

Moreover, the actuating device according to the present invention allows also overcoming the drawbacks affecting the electro-mechanical apparatus known in the art; in fact, a use of a single actuator for both the braking and the backlash recovery phases reduces dimensions, weight, and complexity of the device. Since the brake phase and the recovery phase are separated, the last one can be made during the times of non-utilization of the brakes and will not be required at the beginning of the braking phase. Moreover, due to the solution adopted for the wear recovery (displaceable slide either actuated by resilient means or by rotating means), no particular controls are required during the backlash recovery phase; on the contrary, it is sufficient, in the case of the active layout (exploiting a rotation of the motor during the recovery phase), to apply and then release a given inverse torque to the motor. The small dimensions of the device and the fact that no hydraulic pressure generator is needed allow to create a totally "non suspended" system, i.e. a system that can simply replace the actual calipers. Furthermore, the absence of complicated parts like ball-screws and epicyclic trains again reduces dimensions, weight, complexity, failure modes and cost. The absence of any ball-screw reduces also the noise in all the actuation phases and the dimensions and weight of the present solution may be kept drastically smaller than those of the prior art electromechanical devices.

Finally, the by wire actuating device according to the present invention (or a brake system exploiting this device) could be used in parallel with an electric traction motor, thus realizing a corner by wire architecture. This architecture includes the features of the by wire actuating device and/or brake system and the characteristics of the electric traction on each wheel of the vehicle. On a very single corner, i.e. in proximity of each wheel of the vehicle, two electric motors may be provided, one for the traction and one for the brake system) that are driven by a single electronic control unit. This, in particular, would allow full dynamic control of any single wheel.

Of course, it should be understood that while a range of changes and modifications can be made to the embodiments described above without departing from the scope of the present invention. It has to be, therefore, understood that the scope of the present invention is not limited to the embodiment described but is defined by the appended claims.

What is claimed is:

1. An actuating device for a wheel brake system of a motor vehicle, wherein the wheel brake system comprises at least a friction element adapted to be connected to a vehicle wheel and at least one brake lining adapted to be pressed against and lifted away from the at least one friction element, said actuating device comprising:
    an electric motor,
    rotatable means adapted to be rotated by said electric motor,
    a displaceable actuating member adapted to actuate the at least one brake lining, thus pressing it against the at least one friction element,
    said rotatable means comprising a rotatable element with a surface abutting against said displaceable actuating member so that rotation of the rotatable element in a first rotation sense results in said displaceable actuating member being displaced along a first actuating direction, thus actuating the at least one brake lining and pressing it against the at least one friction element,
    a support frame,
    fixing means for fixing said electric motor to said frame, and
    wherein said fixing means comprise displaceable means adapted to be displaced along a second predefined direction, the displacement of said displaceable means along said second predefined direction resulting in said electric motor being displaced together with said rotatable means along a third predefined direction substantially perpendicular to said second predefined direction and substantially parallel to the first actuating direction.

2. An actuating device as claimed in claim 1 wherein:
said electric motor comprises a rotating shaft and in that said rotatable element is firmly fixed to said shaft.

3. An actuating device as claimed in claim 2 wherein:
the rotatable element is a cam element with a cam surface abutting against said displaceable actuating member.

4. An actuating device as claimed in claim 2 wherein:
said rotatable element is eccentrically fixed to said shaft.

5. An actuating device as claimed in claim 1 wherein:
said displaceable actuating member comprises a rotating element abutting against the surface.

6. An actuating device as claimed in claim 1 wherein:
said displaceable means comprise a sliding member with a sliding surface adapted to slide on a corresponding sliding surface of said frame, said sliding surfaces lying in a plane disposed at an angle $\alpha$ with respect to the second predefined direction.

7. An actuating device as claimed in claim 1 further comprising:
displacing means adapted to displace said displaceable means along the second predefined direction.

8. An actuating device as claimed in claim 7 wherein:
said displacing means comprise a resilient member adapted to pull said displaceable means along the second predefined direction.

9. An actuating device as claimed in claim 7 wherein:
said displacing means are actuated by said electric motor.

10. An actuating device as claimed in claim 9 wherein:
said displacing means comprise a rotatable screw member adapted to be rotated by said motor and a nut or bolt member receiving the rotatable screw member and firmly fixed to said displaceable means, so that rotation of the rotatable screw member results in said displaceable means being displaced along the second predefined direction.

11. An actuating device as claimed in claim 10 wherein:
said rotatable means are adapted to be rotated in a second rotation sense, contrary to the first rotation sense, in that it further comprises stopping means to stop said rotatable means in a predefined home position when they are rotated in the second rotation sense and in that said screw member is rotated in the first sense of rotation when said rotatable means reach the home position, due to the arising reverse torque.

12. An actuating device as claimed in claim 10 wherein:
said screw member is firmly attached to a stator of said electric motor.

13. An actuating device as claimed in claim 11 wherein:
said screw member is fixed to the shaft of said electric motor through a freewheel comprising an inner ring and an outer ring, with said inner ring being mounted on the shaft and said outer ring being coupled with said screw member.

14. An actuating device as claimed in claim 13 wherein:
the shaft comprises a first protruding portion, in that said inner ring comprises a latching member and in that said first protruding portion is adapted to cooperate with said latching member so as to select the sense of free rotation of said inner ring with respect to said outer ring.

15. An actuating device as claimed in claim 14 wherein:
during rotation of the shaft in the first sense of rotation, said latching member is engaged by said first protruding portion, resulting in said inner ring being freely rotated in the first sense of rotation with respect to said outer ring, whilst during rotation of the shaft in the second sense of rotation, said latching member is disengaged from said first protruding portion, thus resulting in said inner ring being freely rotatable in the second sense of rotation, with respect to said outer ring.

16. An actuating device as claimed in claim 15 wherein:
during rotation of the shaft in the second sense of rotation, said inner ring is rotated in the first sense of rotation as soon as the shaft reaches said home position due to the reverse torque arising, thus rotating said outer ring and the screw member in the first sense of rotation, resulting in said displaceable means being displaced in the second predefined direction.

17. A braking system for a motor vehicle, said braking system comprising:
- at least one friction element adapted to be connected to a wheel of the vehicle,
- at least one lining element adapted to be pressed against and lifted away from said at least one friction element,
- an electric motor,
- rotatable means adapted to be rotated by said electric motor,
- a displaceable actuating member adapted to actuate said at least one brake lining, thus pressing it against said at least one friction element,
- said rotatable means comprising a rotatable element with a surface abutting against said displaceable actuating member so that rotation of said rotatable element in a first rotation sense results in said displaceable actuating member being displaced along a first actuating direction, thus actuating said at least one brake lining and pressing it against said at least one friction element,
- a support frame,
- fixing means for fixing said electric motor to said frame, and
- wherein said fixing means comprise displaceable means adapted to be displaced along a second predefined direction, the displacement of said displaceable means along said second predefined direction resulting in said electric motor being displaced together with said rotatable means along a third predefined direction substantially perpendicular to said second predefined direction and substantially parallel to the first actuating direction.

18. A braking system as claimed in claim 17 further wherein:
- said at least one lining element comprises at least two brake linings, and
- an actuating member adapted to press said at least two brake linings against and to lift said at least two brake linings from opposite sides of the at least one friction element.

19. A braking system as claimed in claim 17 further comprising:
- at least one brake pedal; and
- a sensing unit adapted to convert data relating to the displacement of said brake pedal into corresponding signals defining a corresponding brake request.

20. A braking system as claimed in claim 19 further comprising:
- a control unit connected to said sensing unit and adapted to control the function of said electric motor.

21. A braking system as claimed in claim 20 wherein:
said electric motor is rotated in one of the first and second sense of rotation as a function of the signals defining the corresponding brake request.

22. A braking system as claimed in claim 21 further comprising:
means for collecting data relating to said electric motor and providing said control unit with the data, as well as means for controlling the displacement of said displaceable means.

* * * * *

UNITED STATES PATENT AND TRADEMARK OFFICE
CERTIFICATE OF CORRECTION

PATENT NO. : 7,806,239 B2  Page 1 of 1
APPLICATION NO. : 11/637392
DATED : October 5, 2010
INVENTOR(S) : Andrea Tonoli It is certified that error appears in the above-identified patent and that said Letters Patent is hereby corrected as shown below:

Title Page:

Item 75: Inventors     (should read)

Jean Paul Voyat, Gressan (IT)

Signed and Sealed this
Twenty-ninth Day of March, 2011

David J. Kappos
*Director of the United States Patent and Trademark Office*